United States Patent
Kudo et al.

(10) Patent No.: US 6,723,449 B2
(45) Date of Patent: Apr. 20, 2004

(54) STRUCTURE AND PLATING METHOD OF THIN FILM MAGNETIC HEAD AND MAGNETIC STORAGE APPARATUS

(75) Inventors: Kazue Kudo, Odawara (JP); Yasuyuki Okada, Odawara (JP); Nobuo Yoshida, Odawara (JP); Moriaki Fuyama, Hitachi (JP); Noriyuki Saiki, Odawara (JP); Gen Oikawa, Odawara (JP); Takashi Kawabe, Hitachi (JP); Makoto Morijiri, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 09/917,892

(22) Filed: Jul. 31, 2001

(65) Prior Publication Data

US 2002/0106533 A1 Aug. 8, 2002

(30) Foreign Application Priority Data

Dec. 7, 2000 (JP) ........................ 2000-377989

(51) Int. Cl.$^7$ ............................... G11B 5/127
(52) U.S. Cl. .................. 428/611; 428/678; 428/692; 360/126; 360/317
(58) Field of Search ............... 428/64.3, 64.9, 428/611, 692, 694 R, 694 ML, 694 MT, 694 MM, 694 T, 694 TM, 697, 900, 678; 427/128, 130, 131; 204/192.15, 192.2; 360/120, 126, 317; 205/119, 122, 269, 350, 9.22

(56) References Cited

U.S. PATENT DOCUMENTS

| | | | | |
|---|---|---|---|---|
| 5,862,022 A | * | 1/1999 | Noguchi et al. | 204/192.2 |
| 5,935,403 A | * | 8/1999 | Suzuki et al. | 205/922 |
| 6,120,918 A | * | 9/2000 | Osaka et al. | 427/128 |
| 6,239,948 B1 | * | 5/2001 | Wu et al. | 360/120 |
| 6,262,867 B1 | * | 7/2001 | Sano et al. | 360/126 |
| 6,466,416 B1 | * | 10/2002 | Honjo et al. | 360/317 |

FOREIGN PATENT DOCUMENTS

| | | |
|---|---|---|
| JP | 6089422 | 9/1992 |
| JP | 6346202 | 6/1993 |
| JP | 7003489 | 8/1993 |
| JP | 8241503 | 3/1995 |

* cited by examiner

*Primary Examiner*—Stevan A. Resan
(74) *Attorney, Agent, or Firm*—Reed Smith LLP; Stanley P. Fisher, Esq.; Juan Carlos A. Marquez, Esq.

(57) ABSTRACT

A material for magnetic pole for attaining a writing head generating an intense recording magnetic field, and a structure and a manufacturing method therefor. The thin film magnetic head includes a magnetic pole layer having a plated magnetic layer containing Co, Ni and Fe formed on a plated underlayer of a sputtered magnetic layer containing Co, Ni and Fe. The CoNiFe magnetic layer having a composition: 40 wt %$\leq$Co$\leq$70 wt %, 10 wt %$\leq$Ni$\leq$25 wt % and 10 wt %$\leq$Fe$\leq$30 wt % and a peak intensity ratio in the X-ray diffraction of I(200)/I(111)$\geq$0.5 and I(110)/I(111)$\geq$1 (defining peak intensities for the face-centered cubic fcc (111) face, fcc (200) face and the body-centered cubic bcc (119) face as: I(111), I(200), I(110)).

5 Claims, 7 Drawing Sheets

STRUCTURE AND PLATING METHOD OF THIN FILM MAGNETIC HEAD AND MAGNETIC STORAGE APPARATUS

PRIORITY TO FOREIGN APPLICATIONS

This application claims priority to Japanese Patent Application No. P2000-377989.

BACKGROUND OF THE INVENTION

1. Field of the Invention

The present invention relates to a thin film magnetic head used for recording/reproduction in a magnetic disk storage apparatus, a manufacturing method therefor, and a magnetic disk storage apparatus and disk array system in which to mount the thin film magnetic head.

2. Description of the Background

Along with an increase in the recording density of magnetic disk storage apparatuses, the coercive force of the recording media has also been increased. A need has been recognized in the art to provide a material having a high saturation magnetic flux density (Bs) that is capable of producing a magnetic field strong enough to write into a high coercive medium for the magnetic core material or writing heads.

Materials having a high saturation magnetic flux density include CoNiFe (Bs>1.7T) which has a higher Bs than $Ni_{45}Fe_{55}$ that is currently used as the magnetic core material (Bs: 1.6T) as described in JP-A-89422/1994, JP-A-241503/1996, JP-A-346202/1994 and JP-A-3489/1995. Further, Japanese Patent Publication No. 2821456 discloses a method of preparing a plated layer with a high Bs using a bath without the addition of saccharine sodium in the plating solution composition.

To attaining a magnetic disk storage apparatus with high recording density, it may be necessary to use a layer forming technique capable of stably forming a magnetic core with an increased thickness for generating a more intense magnetic field. The technique includes the use of a material with a high saturation magnetic flux density (Bs) capable of producing a sufficient magnetic field to write into a high coercive force medium.

As described in Japanese Patent Publication No. 2821456, the Co—Ni—Fe soft magnetic material layer prepared from a bath that does not contain a stress relieving agent has a Bs of at least 1.9T and a Hch of no more than 2.5 Oe. Because since the stress of the plated layer is large, peeling may ensure in a formed layer with a thickness greater then approximately 2.0 $\mu$m, making the layer formation difficult.

Further, as described in JP-A-346202/1994, the soft magnetic Co—Ni—Fe material layer prepared from a bath containing a stress relieving agent may provide a layer with a low coercive force of approximately Hch=0.4 Oe. However, assuming the peak intensities at fcc (111) face, fcc (200) face and bcc (110) face in the X-ray diffraction as I(111), I(200) and I(110), respectively, such a layer could not be obtained unless a substantially face-centered cubic system was formed having a peak intensity ratio of $0.1 \leq I(200)/I(111) \leq 0.2$ and annealing was applied after the formation of the layer. Further, unevenness may increase in the surface shape of a layer if the layer composition is deviated in a region containing a slight amount of body-centered cubics in the face-centered cubics, which results in clouding and an inability to obtain a gloss layer.

As can be seen from the conventional applications described above, it is difficult to stably mass produce magnetic heads having high saturation magnetic flux density capable of producing sufficient magnetic fields which correspond to a high recording density.

SUMMARY OF THE INVENTION

To address one or more of the above limitations in the conventional devices, in accordance with at least one preferred embodiment of the present invention, a magnetic layer containing Co, Ni and Fe is formed by a sputtering method as a plated underlayer and a magnetic layer containing Co, Ni and Fe is formed on the plated underlayer by an electroplating method to form a magnetic pole layer. In accordance with this invention, Co, Ni and Fe are preferably present as: 40 wt %$\leq$Co$\leq$70 wt %; 10 wt %$\leq$Ni$\leq$25 wt %; and 10 wt %$\leq$Fe$\leq$30 wt % in the sputtered layer as the plated layer and the plated underlayer. Further, in accordance with this invention, only bcc is preferably observed for the sputter layer as the plated underlayer under X-ray diffraction, and the peak intensity ratio is: $I(200)/I(111) \geq 0.5$ and $I(110)/I(111) \geq 1$, when defining peak intensities in fcc (111) face, fcc (200) face, and bcc (110) face in the X-ray diffractiometry for the plated layer as I(111), I(200) and I(110), respectively.

A small peak intensity ratio I(200)/I(111), I(110)/I(111) means that crystals are intensely oriented to the face-centered cubic fcc (111) face. The films which are substantially fcc described in JP-A-34020/1994, Japanese Patent Publication No. 2821456 belong to this case. However, since the present invention preferably uses a soft magnetic thin film in which the constitutional ratio of the face-centered cubic system and body-centered cubic system (ratio for the body-centered cubic system and the face-centered cubic system in the magnetic layer) is: 40%$\leq$body-centered cubic system$\leq$80% and 20%$\leq$face-centered cubic system$\leq$60%, and face-centered cubic system+body-centered cubic system is 100%, it may suffice that the peak intensity ratio is $I(200)/I(111) \geq 0.5$ and $I(110)/I(111) \geq 1$. In addition, since a lot of body-centered cubic system is contained in the layer, the deviation in the layer composition, if any, preferably has no effect on the surface shape of the layer, and a glossy layer can be prepared stably as in this invention.

Additionally, by using a CoNiFe layer also for the plated underlayer, the crystallinity of the plated layer is enhanced, and the crystallographic orientation can be controlled more easily with the present invention compared to the conventional applications. When the CoNiFe layer is used partially or entirely for the upper magnetic pole of the writing head, since the underlayer is situated on the side of the magnetic gap relative to the lower magnetic pole, the saturation magnetic flux of the underlayer, when using a permalloy layer for instance, is lower than that of the plated layer which decreases the writing magnetic field.

On the contrary, when the CoNiFe layer is used according to this invention, it preferably has a saturation magnetic flux density equal to or greater than the plated layer to improve the characteristics of the head. When different kinds of metals are laminated, they may lead to cell reactions that may possibly corrode the CoNiFe plated layer, but such corrosion may be avoided when the CoNiFe layer is used also for the underlayer, as in at least one preferred embodiment of the present invention.

The CoNiFe magnetic thin film of the present invention may form a CoNiFe magnetic plated layer containing saccharine sodium by preparing the layer from a plating bath containing saccharine sodium as a stress relieving agent and conducting the electroplating under the following preferred conditions: a bath temperature within the range from 25° C. to 35° C.; a current density from 3 to 12 mA/cm$^2$; and a pH value from approximately 3.2 to 4.0. A thick layer of at least 3 μm may also be formed by conducting plating under the plating conditions described above.

Further, the magnetic characteristics of the soft magnetic layer obtained according to preferred embodiments of the present invention may have: a saturation magnetic flux density Bs of: 17500 gauss≦Bs<20000 gauss; a coercive force in the difficult axis direction Hch of: Hch<1.50 Oe; and a saturation magnetic flux density of the underlayer that is greater than the Bs of the plated layer. While JP-A-3489/1995 describes that the coercive force is increased at the peak intensity ratio: I(200)/I(111)≧0.2, a coercive force of Hch<1.5 Oe is preferably attained by the present invention thus avoiding one or more of the conventional difficulties.

Further, in a recording/reproducing separation type thin film magnetic head using a magnetoresistive element for the reading device and an induction type magnetic head for the writing device, recording may be possible to a recording medium with a coercive force of at least 4000 Oe by using the soft magnetic CoNiFe layer partially or entirely as the lower and upper magnetic cores of the writing head according to the present invention.

Additional objects, features and/or advantages of the invention will appear more fully from the following description of the invention, drawings, and attached claims.

BRIEF DESCRIPTION OF THE DRAWINGS

To enable the present invention to be more clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

FIG. 1 shows a process flow for a magnetic pole layer of a writing head in a thin film magnetic head in a first exemplary embodiment according to the present invention. After preparing a 46NiFe layer 2 on a substrate 1 in which a reading head is formed, an Ar gas is preferably introduced into a sputtering chamber at a degree of attained vacuum of at least 5×10$^{-5}$ Pa, and a CoNiFe layer 3 as a plated underlayer is formed to 100 nm by a DC or RF sputtering method using a CoNiFe alloy target (FIG. 1A). In this case, a non-magnetic metal may be formed to about 5 nm as an adhesion layer. A CoNiFe layer 4 is prepared on the underlayer 3 using a plating solution containing saccharine sodium at approximately 1.5 g/l as a stress relieving agent under the conditions shown in Table 1.

Figure 1A:
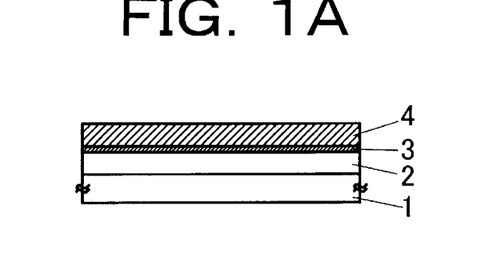
FIG. 1 illustrates a process flow for a magnetic pole layer of a writing head for a thin film magnetic head.
Figure 1B:
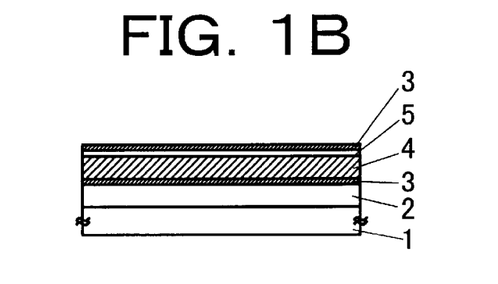

In FIG. 1B, a magnetic gap layer 5 is formed thereon. As the magnetic gap layer 5, an insulation layer made of materials such as Al$_2$O$_3$ or SiO$_2$ is used as a single layer or a lamination layer. On this gap layer 5, a CoNiFe layer 3 as a plated underlayer is preferably formed using a sputtering method in the same manner as described above.

Figure 1C:
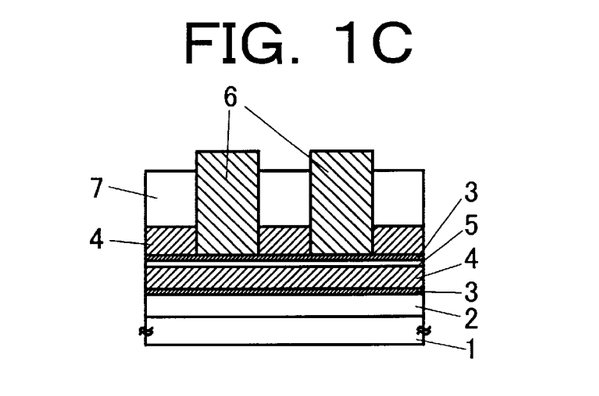
Figure 1D:
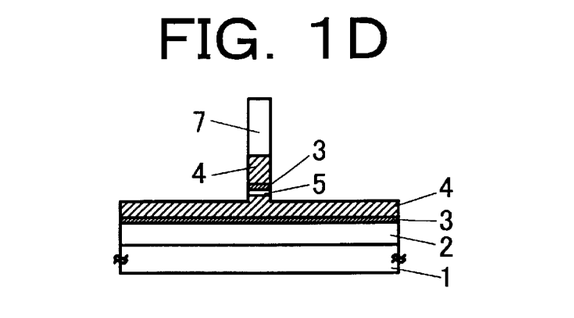

A resist frame 7 for forming an upper magnetic core is prepared and, after pattering the same into a predetermined shape, a CoNiFe layer 4 and a 46NiFe layer 6 are prepared successively by the plating method (FIG. 1C). While the 46NiFe layer 6 is used to a portion of the upper and lower magnetic poles in this example, the entire portion may be formed by using the CoNiFe layer 4 according to this invention.

TABLE 1

| Plating bath temperature | 30° C. |
|---|---|
| pH | 3.5 |
| Current density | 6 mA/cm$^2$ |
| Co$^{++}$ | 5 g/l |
| Ni$^{++}$ | 15 g/l |
| Fe$^{++}$ | 2 g/l |
| Saccharine sodium | 1.5 g/l |

The resist 7 and the underlayer 3 are removed, and a trimming step is thereafter applied for fabricating the upper and lower magnetic cores, each to a predetermined track width.

Figure 2:
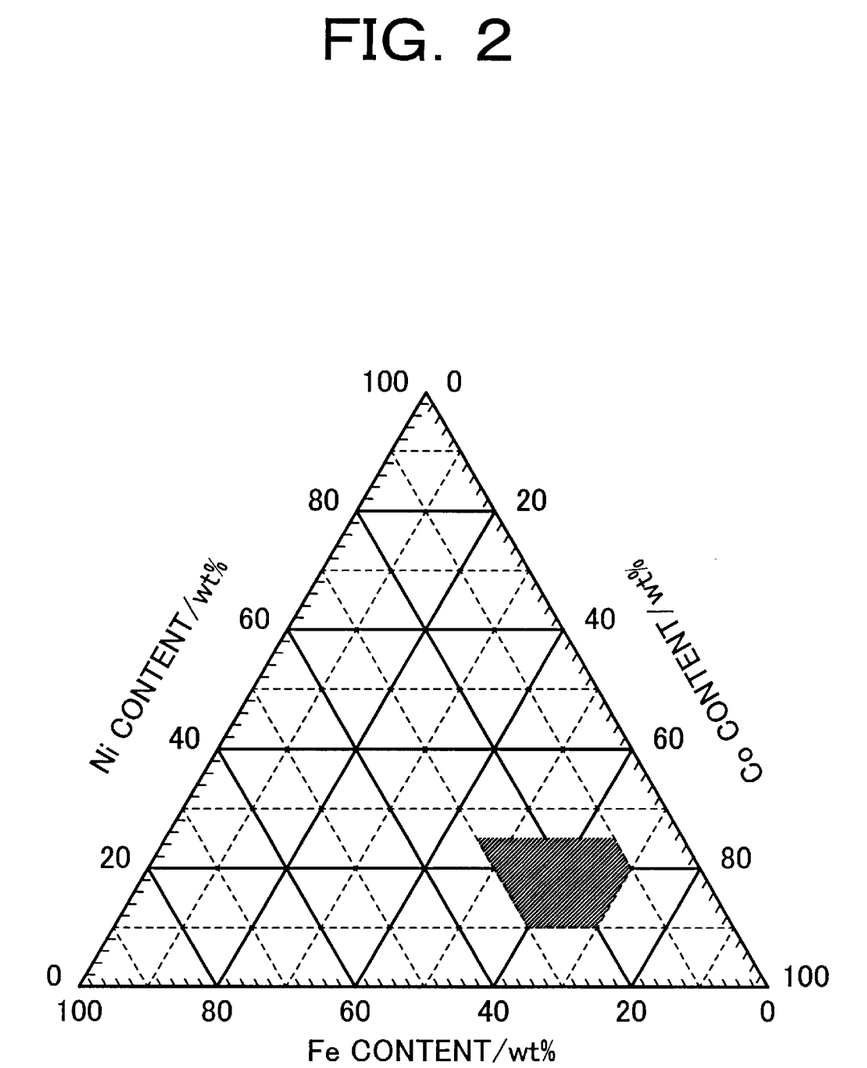
FIG. 2 is a ternary system diagram showing the compositional range for a CoNiFe layer obtained according to the present invention.

Exemplary plating conditions are shown in Table 1, and a compositional range for preparing a CoNiFe layer is shown in FIG. 2; specifically, 45 wt %≦Co≦70 wt %, 10 wt %≦Ni≦25 wt % and 10 wt %≦Fe≦30 wt %, within the range shown in Table 2.

TABLE 2

| Plating bath temperature | 25–35° C. |
|---|---|
| pH | 3.2–4.0 |
| Current density | 3–12 mA/cm$^2$ |
| Co$^{++}$ | 2–20 g/l |
| Ni$^{++}$ | 5–30 g/l |
| Fe$^{++}$ | 1–4 g/l |
| Saccharine sodium | 0.5–2.0 g/l |

Figure 3:
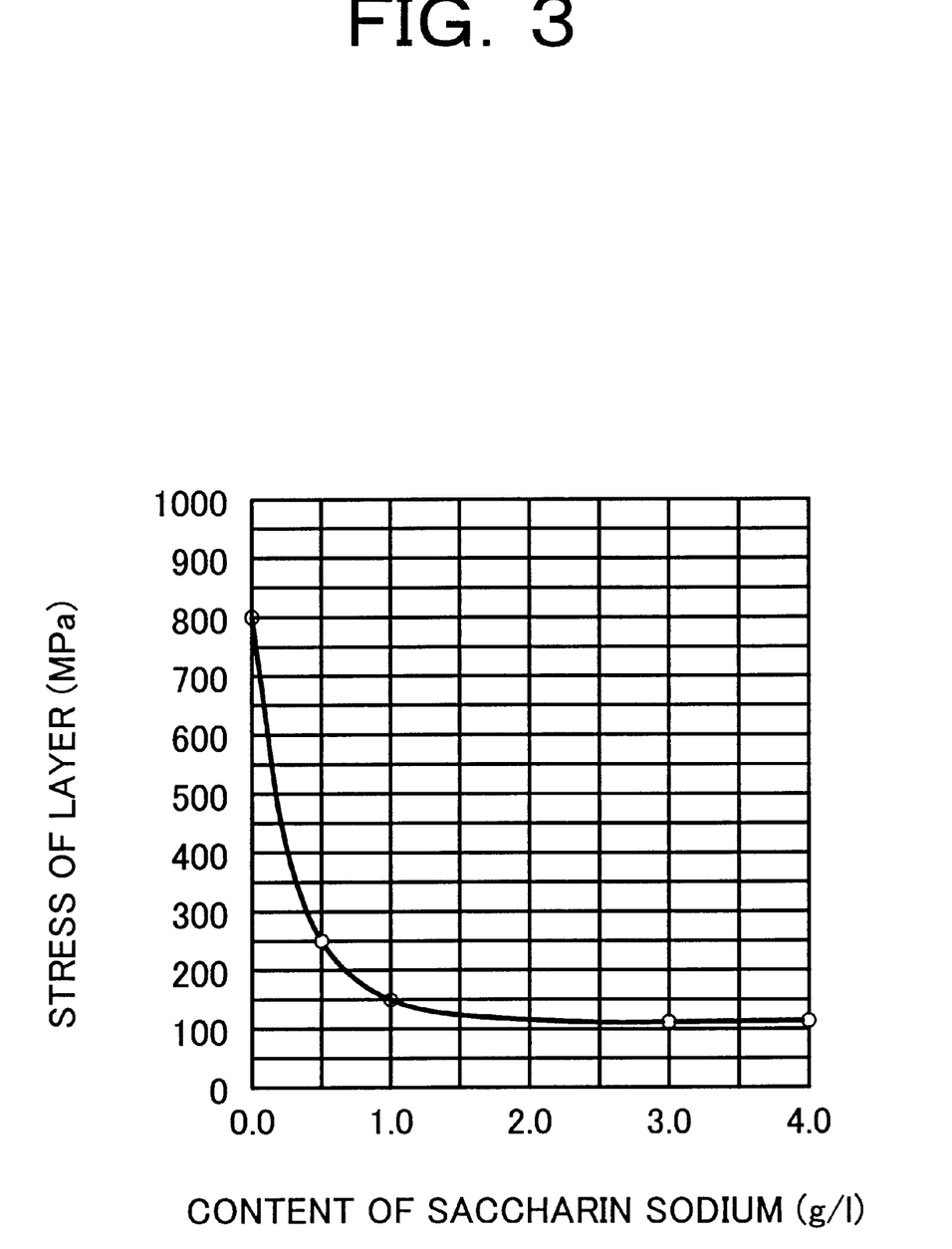
FIG. 3 is a graph showing the relationship between the amount of saccharine sodium added and the layer stress of the CoNiFe layer.

Further, as shown in FIG. 3, when saccharine sodium is added by about 0.5 g/l, the stress in the layer can be reduced to about 200 MPa. However, if it is added by 2.5 g/l or more, the stress does not change substantially. In addition, since the amount of S in the layer is increased to deteriorate the corrosion resistance, the addition amount of saccharine sodium is preferably between 0.5 to 2.0 g/l.

Figure 4A:
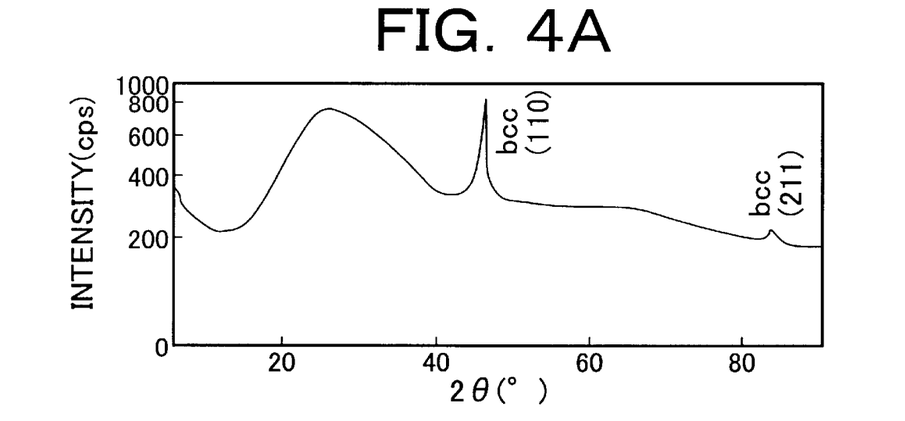
FIG. 4 is a graph showing an X-ray diffraction pattern of a CoNiFe layer.
Figure 4B:
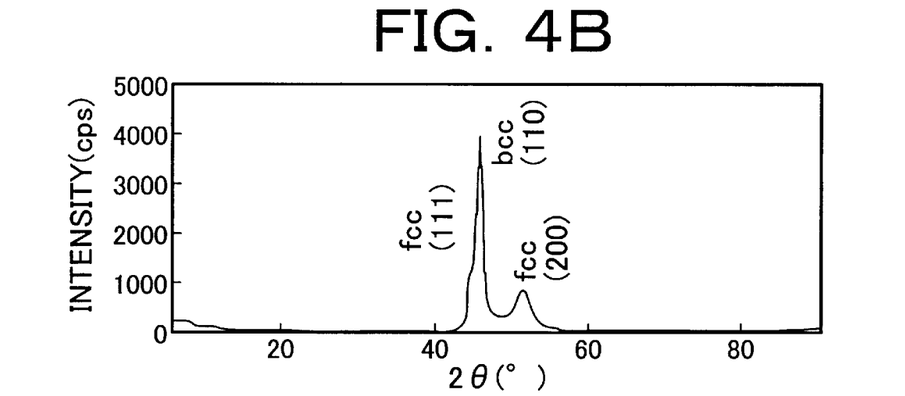
Figure 4C:
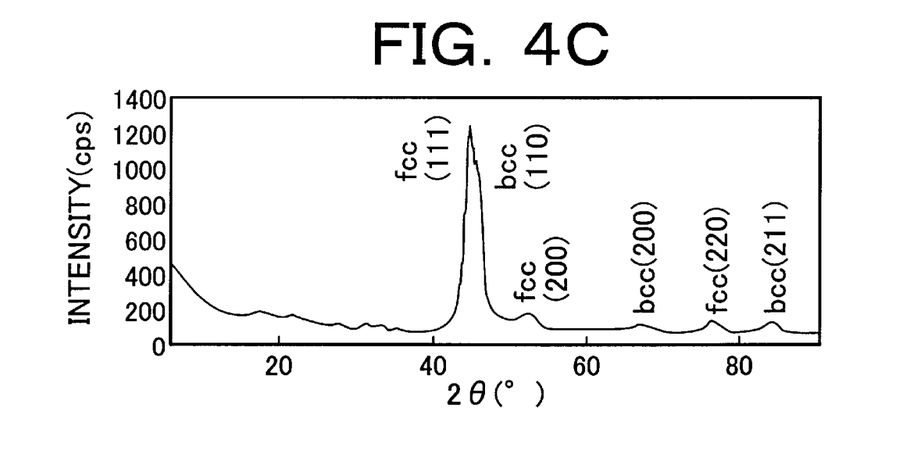

FIG. 4 shows an X-ray diffraction pattern of the CoNiFe layer. There are shown: a CoNiFe layer prepared by the sputtering method (FIG. 4A); a CoNiFe layer prepared by the electroplating method on this underlayer (FIG. 4B); and a CoNiFe layer prepared by the conventional method (FIG. 4C). For the CoNiFe layer prepared by the sputtering method, only the body-centered cubic system is observed.

In the CoNiFe plated layer formed on the above-mentioned layer, the face-centered cubic system and the body-centered cubic system are observed to have a peak intensity ratio: I(200)/I(111)=1.62 and I(110)/I(111)=4.9 when defining the peak intensities for the face-centered cubic fcc (111) face, fcc (200) face and the body-centered cubic bcc (110) face as I(111), I(200) and I(110), respectively. Further, when the constitutional ratio is determined by peak decomposition, the body-centered cubic system is preferably 53% and the face-centered cubic system is 47%. On the contrary, the layer prepared by the conventional method consists almost entirely of the face-centered cubic system, with little body-centered cubic system observed.

When the peak intensity ratio by the X-ray diffraction is: I(200)/I(111)≧0.5 and I(110)/I(111)≧1, the purpose of this invention may be attained. Further, when the constitutional ratio for the face-centered cubic system and the body-centered cubic system is 40%≦body-centered cubic system≦80% and 20%≦face-centered cubic system≦60% providing that the face-centered cubic system+body-centered cubic system=100, the purpose of this invention may similarly be attained.

Figure 5:
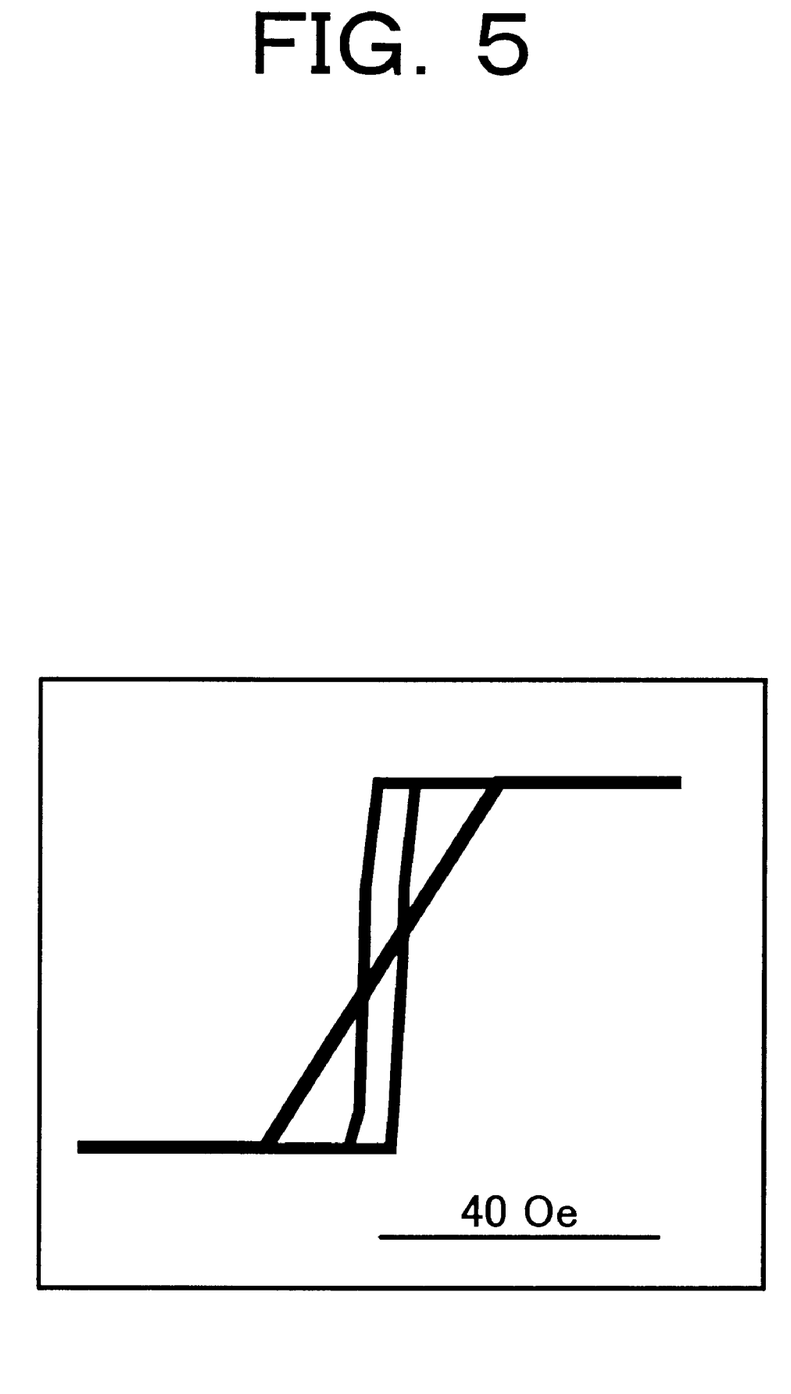
FIG. 5 shows a B–H curve of a CoNiFe layer according to the present invention.

FIG. 5 shows a B–H curve for a CoNiFe layer prepared according to at least one embodiment of the present invention. The magnetic characteristics of the magnetic layer are such that the saturation magnetic flux density Bs is 18200 gauss and the coercive force Hch in the direction of the difficult axis is 0.7 Oe. Referring to Bs, when 17500 gauss≦Bs<20000 gauss and Hch<1.5 Oe, the purpose of this invention may be attained.

Figure 6:
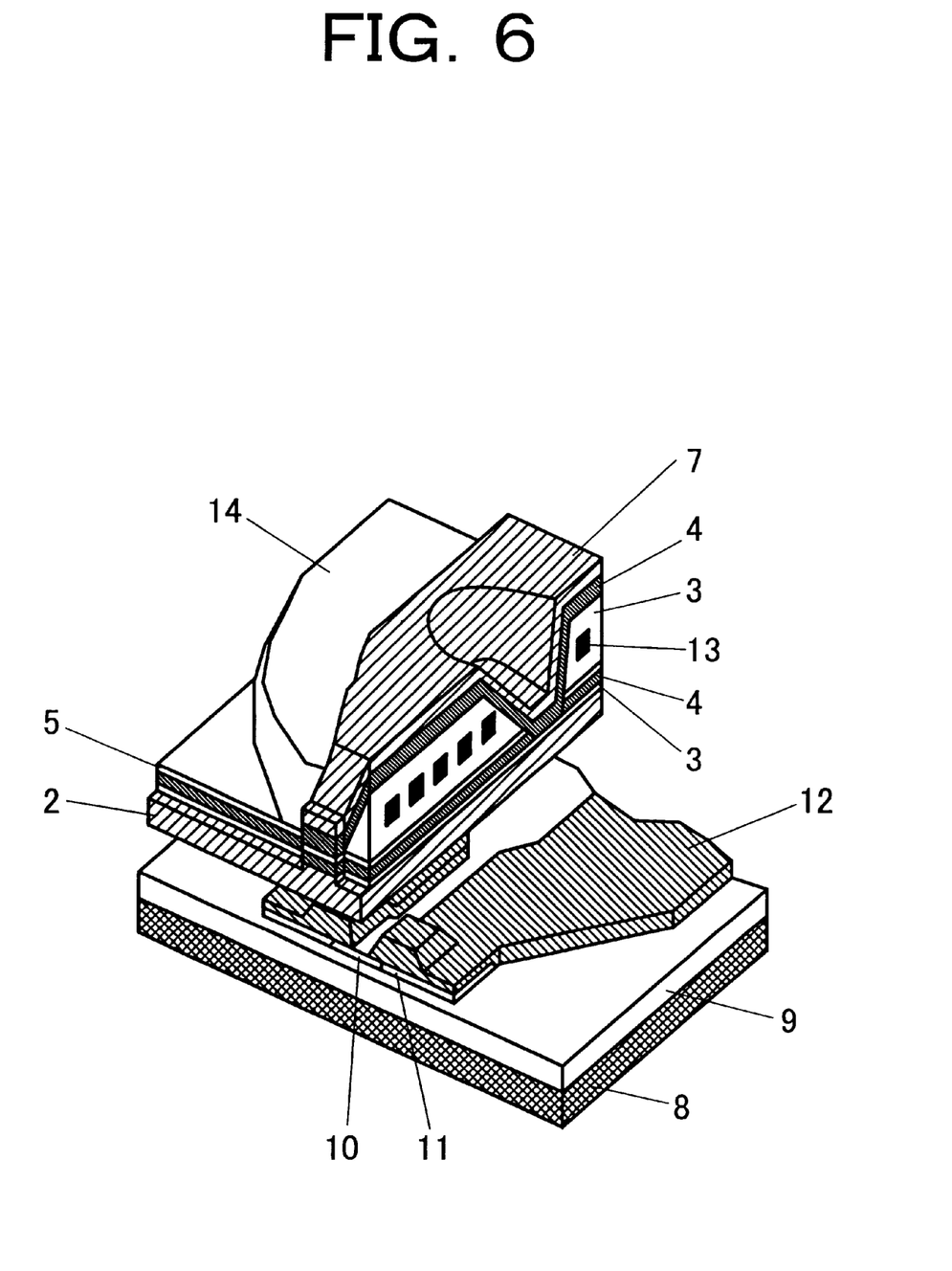
FIG. 6 is a cross sectional view of a recording/reproducing separation type thin film magnetic head using the CoNiFe layer prepared according to the present invention to the upper portion of writing head and to a portion of a lower magnetic core.

FIG. 6 shows a cross sectional view of an exemplary recording/reproducing separation type thin film magnetic head using the CoNiFe layer prepared according to the invention for the upper portion of the writing head and a portion of the lower magnetic core. A lower shield layer 9 and a lower magnetic gap layer are formed on a non-magnetic substrate 8, on which an MR or GMR sensor 10 is formed as a reading device. After forming a magnetic domain control layer 11 and an electrode layer 12, an upper magnetic gap layer and an upper magnetic shield layer 2 are formed. Further, a magnetic gap layer 5 for the reading device and the writing device is formed, on which a lower magnetic core is formed.

A 46NiFe layer is formed as the lower magnetic core by the plating method. A CoNiFe layer 3 is formed to 100 nm by sputtering, and then a CoNiFe layer 4 is plated to a predetermined thickness by a plating method. Successively, the magnetic gap layer was formed. After forming coils 13 for supplying a recording current and an organic insulating layer, another CoNiFe layer 3 is formed to 100 nm by sputtering and a resist frame for forming the upper magnetic core is prepared. Another CoNiFe layer 4 and a 46NiFe layer are prepared successively by a plating method.

The resist and the underlayer are removed, and, for fabricating both the upper and lower magnetic core to a predetermined track width, a trimming step is applied. Further, coils and an organic insulating layer are formed and the 46NiFe layer is frame plated. After fabrication, experiments confirmed that the recording/reproducing separation type thin film magnetic head manufactured as described above showed favorable recording characteristics and could conduct recording satisfactorily to a high coercive force medium.

Figure 7:
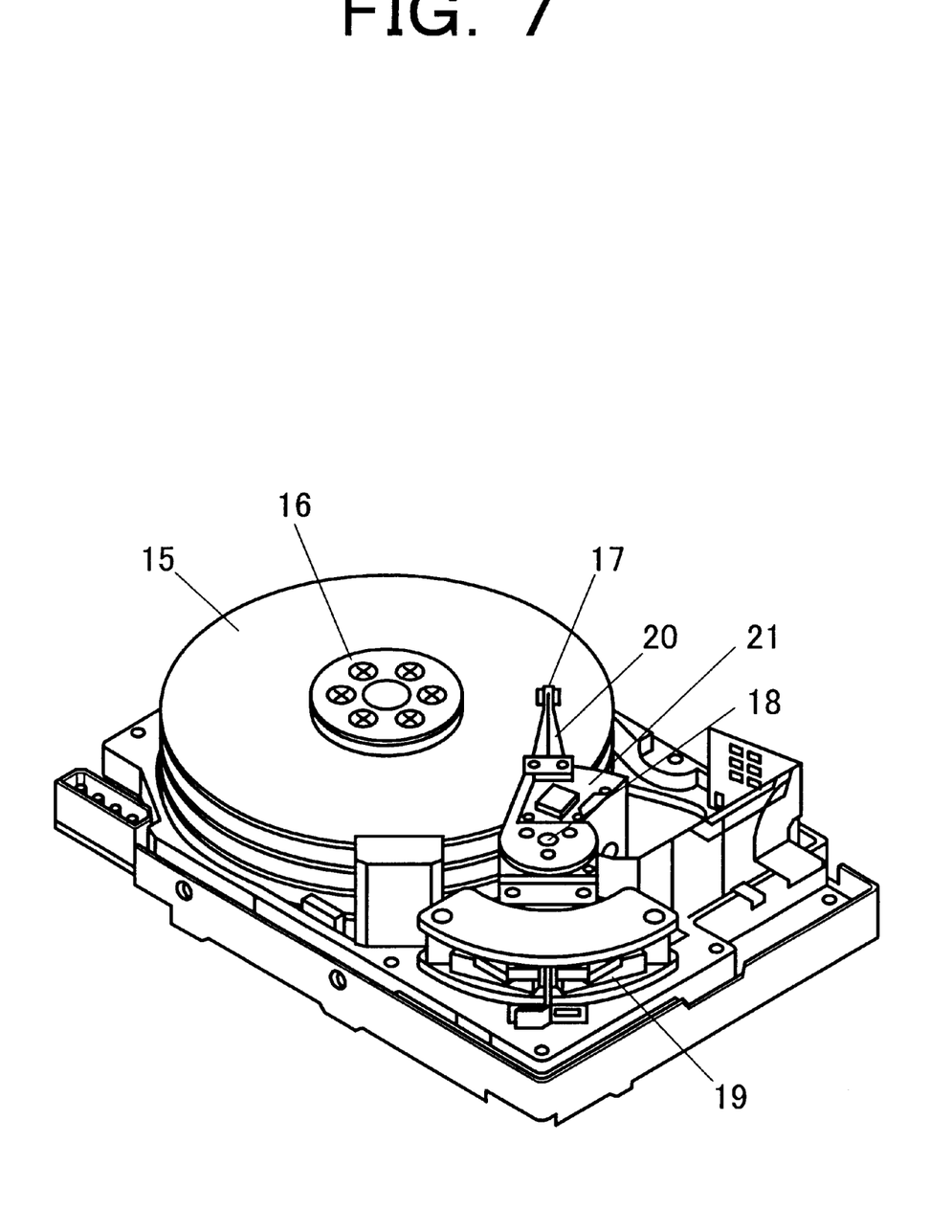
FIG. 7 is a perspective view illustrating a structure of a magnetic disk storage apparatus according to a preferred embodiment of the present invention.

FIG. 7 is a perspective view of an exemplary magnetic disk storage apparatus mounting a thin film magnetic head manufactured according to this invention. The magnetic disk storage apparatus preferably includes: a magnetic disk 15 for recording information; a motor for rotating the magnetic disk 15; an actuator for locating the magnetic head 17 for writing information to the magnetic disk 15 and reading information from the magnetic disk to an aimed position; and a voice coil motor 19.

The storage apparatus may also include a spring attached to the magnetic head for stably keeping the sub-micron space relative to a magnetic disk 15 and a guide arm 20 fixed with the spring, which is driven by the actuator and voice coil motor. Further, although not illustrated, the apparatus also comprises a magnetic disk rotation control system, a head positioning control system and a recording/reproducing signal processing system. With the structure described above, a magnetic disk storage apparatus of high recording density may be attained.

using a magnetic head produced in accordance with the present invention, an intense recording magnetic field may be generated, and a thin film magnetic head corresponding to high recording density can be provided.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A magnetic head comprising:
   a reading head using a magnetoresistive element, and
   a writing head using a lower magnetic core and an upper magnetic core, wherein at least one core selected from said lower magnetic core and said upper magnetic core includes a first magnetic layer comprising Co, Ni and Fe deposited by a sputtering method and a second magnetic layer comprising Co, Ni and Fe deposited by an electroplating method, and further wherein at least one core selected from said lower magnetic core and said upper core contains Co, Ni and Fe comprising a composition: 40 wt %≦Co≦70 wt %, 10 wt %≦Ni≦25 wt %, and 10wt %≦Fe≦30wt %; and further wherein the peak intensity ratio is: I(200)/I(111)
≧0.5 and I(110)/I(111)≧1 when defining the peak
intensities of the face-centered cubic fcc (111) face, fcc
(200) face, and the body-centered cubic bcc (110) face
in the X-ray diffraction as I(111), I(200) and I(110),
respectively.

2. A thin magnetic head, comprising:

a lower magnetic core; and an upper magnetic core, wherein at least one core selected from said lower magnetic core and said upper magnetic core includes a first magnetic layer comprising Co, Ni, and Fe deposited by a sputtering method, and a second magnetic layer comprising Co, Ni, and Fe deposited by an electroplating method, wherein said second magnetic layer has a constitutional ratio of face-centered cubic system and body-centered cubic system of: 40%≦body-centered cubic system≦80% and 20%≦face-centered cubic system≦60%, further wherein said face-centered cubic system+body-centered cubic system=100%.

3. The thin film magnetic head of claim 2, wherein said first magnetic layer is comprised of: 40 wt % Co≦70 wt %, 10 wt %≦Ni≦25 wt % and 10 wt %≦Fe≦30 wt %; and wherein said second magnetic layer is comprised of: 40 wt % Co≦70 wt %, 10 wt %≦Ni≦25 wt % and 10 wt %≦Fe≦30 wt %.

4. The thin film magnetic head of claim 2, wherein said second magnetic layer comprises saccharine sodium.

5. The thin film magnetic head of claim 2, wherein said second magnetic layer has a peak intensity ratio of I(200)/I(111)≧0.5 and I(110)/I(111)≧1.

* * * * *